(12) United States Patent
Hao et al.

(10) Patent No.: US 12,384,055 B1
(45) Date of Patent: Aug. 12, 2025

(54) MULTI-DEGREE-OF-FREEDOM BIONIC DEXTEROUS HAND

(71) Applicant: SHENZHEN ZHAOWEI MACHINERY & ELECTRONICS CO., LTD., Shenzhen (CN)

(72) Inventors: Shiquan Hao, Shenzhen (CN); Junheng Wang, Shenzhen (CN); Ping Li, Shenzhen (CN)

(73) Assignee: Shenzhen Zhaowei Machinery & Electronics Co., LTD., Shenzhen (CN)

( * ) Notice: Subject to any disclaimer, the term of this patent is extended or adjusted under 35 U.S.C. 154(b) by 0 days.

(21) Appl. No.: 19/004,579

(22) Filed: Dec. 30, 2024

(30) Foreign Application Priority Data

May 8, 2024 (CN) .......................... 202410558656.9

(51) Int. Cl.
   B25J 15/10 (2006.01)
(52) U.S. Cl.
   CPC ..................... B25J 15/10 (2013.01)
(58) Field of Classification Search
   CPC ....................................................... B25J 15/10
   See application file for complete search history.

(56) References Cited

U.S. PATENT DOCUMENTS

| | | | |
|---|---|---|---|
| 4,367,891 A | 1/1983 | Wauer | |
| 8,100,451 B2 * | 1/2012 | Okuda | B25J 15/0009 294/213 |
| 8,936,289 B1 * | 1/2015 | Kozlowski | B25J 19/0091 901/45 |
| 8,936,290 B1 * | 1/2015 | Salisbury | B25J 15/0009 294/111 |
| 9,669,551 B1 * | 6/2017 | Salisbury | B25J 15/0009 |

(Continued)

FOREIGN PATENT DOCUMENTS

| | | |
|---|---|---|
| CN | 107511837 | 12/2017 |
| CN | 107932536 | 4/2018 |

(Continued)

OTHER PUBLICATIONS

European Search Report from corresponding EP Application 24222709.8 dated Mar. 7, 2025.

(Continued)

*Primary Examiner* — Stephen A Vu
(74) *Attorney, Agent, or Firm* — Ruggiero McAllister & McMahon LLC

(57) ABSTRACT

A multi-degree-of-freedom bionic dexterous hand includes a palm structure, a bionic thumb, a multifunctional bionic finger, and a dexterous bionic finger. The bionic thumb includes a first phalanx structure and a rotary disk, the rotary disk is configured to rotate on the palm structure, the first phalanx structure is hinged to the rotary disk, and the rotation axis of the rotary disk is not parallel to the rotation axis of the first phalanx structure. The multifunctional bionic finger includes a second phalanx structure, the second phalanx structure is universally hinged to the palm structure, and the second phalanx structure can perform the flexion-extension movement and the swinging movement. The dexterous bionic finger includes a third phalanx structure, the third phalanx structure is hinged to the palm structure, and the third phalanx structure can perform the flexion-extension movement.

16 Claims, 5 Drawing Sheets

(56) References Cited

U.S. PATENT DOCUMENTS

| | | | | |
|---|---|---|---|---|
| 2014/0132021 | A1* | 5/2014 | Claffee | ............... B25J 15/103 901/31 |
| 2022/0105643 | A1 | 4/2022 | Shannon | |
| 2022/0249258 | A1 | 8/2022 | Jury | |

FOREIGN PATENT DOCUMENTS

| | | |
|---|---|---|
| CN | 107932541 | 4/2018 |
| CN | 108214520 | 6/2018 |
| CN | 110640773 | 1/2020 |
| CN | 115502962 | 12/2022 |
| CN | 219705198 | 9/2023 |
| CN | 117047810 | 11/2023 |
| CN | 118123871 | 6/2024 |
| JP | H04189493 | 7/1992 |
| JP | H08126984 | 5/1996 |
| JP | 3706655 | 10/2005 |
| JP | 2009078341 | 4/2009 |
| JP | 2022515649 | 2/2022 |
| KR | 20100112670 | 10/2010 |
| KR | 20230101229 | 7/2023 |
| WO | 2023207129 | 11/2022 |

OTHER PUBLICATIONS

Peruz et al; Development of a robotic hand using bioinspired optimization for mechanical and control: UnB-Hand; IEEE Access; Apr. 13, 2021.

Lee et al; Development of bio-minetic robot hand using parallel mechanisms; IEEE International Conference; Dec. 12, 2009.

English translation of International Search Report from corresponding PCT App. PCT/CN2024/112726 dated Dec. 24, 2024.

* cited by examiner

MULTI-DEGREE-OF-FREEDOM BIONIC DEXTEROUS HAND

CROSS-REFERENCE TO RELATED APPLICATION

This application claims priority to Chinese Patent Application No. 202410558656.9 filed May 8, 2024, the disclosure of which is incorporated herein by reference in its entirety.

TECHNICAL FIELD

The present disclosure relates to the field of robotics technologies and, in particular, to a multi-degree-of-freedom bionic dexterous hand.

BACKGROUND

The robot is one of the current research hotspots. The bionic fingers of the robot have sophisticated and complex structures with mechanical and electrical components integrated within a limited space, which has a certain impact on the gripping force, dexterity, and functional diversity of the bionic fingers. Therefore, how to improve the gripping force and dexterity of the bionic fingers and enrich the functions of the bionic fingers has become one of the difficulties in the current technological development.

The existing bionic hand is equipped with five electric motors on the palm housing, and the five electric motors are connected to five bionic fingers, respectively, so that the five bionic fingers can be controlled to achieve the gripping movement. The phalanges of the finger structure are drivingly connected by tendons. The phalanges in the finger structure have only slave degrees of freedom and do not have the conditions for independent movement. The dexterity and the gripping force are insufficient. Each bionic finger can only bend toward the palm and cannot move in other directions. The function is single.

SUMMARY

The present disclosure provides a multi-degree-of-freedom bionic dexterous hand so that the bionic dexterous hand has multiple degrees of freedom, thereby enriching the functions of the bionic dexterous hand.

A multi-degree-of-freedom bionic dexterous hand includes a palm structure, a bionic thumb, a multifunctional bionic finger, and a dexterous bionic finger.

The bionic thumb includes a first phalanx structure and a rotary disk, where the rotary disk is configured to rotate on the palm structure, the first phalanx structure is hinged to the rotary disk, and the rotation axis of the rotary disk is not parallel to the rotation axis of the first phalanx structure.

The multifunctional bionic finger includes a second phalanx structure, where the second phalanx structure is universally hinged to the palm structure, and the second phalanx structure is capable of performing the flexion-extension movement and the swinging movement.

The dexterous bionic finger includes a third phalanx structure, where the third phalanx structure is hinged to the palm structure, and the third phalanx structure is capable of performing flexion-extension movement.

As an optional technical solution, the bionic thumb further includes a first linear motor, two ends of the first linear motor are hinged to the rotary disk and the first phalanx structure, respectively, and the first linear motor is used for driving the first phalanx structure to perform the flexion-extension movement.

As an optional technical solution, the bionic thumb further includes a root linear motor, two ends of the root linear motor are hinged to the rotary disk and the palm structure, respectively, and the root linear motor is used for driving the rotary disk to rotate on the palm structure.

As an optional technical solution, the multifunctional bionic finger further includes two second linear motors, two ends of each of the two second linear motors are universally hinged to the second phalanx structure and the palm structure, respectively, and the two second linear motors are used for driving the second phalanx structure to perform the flexion-extension movement or the swinging movement.

As an optional technical solution, the root of the second phalanx structure is hinged to the palm structure through a spherical pair with pin, an end of each of the two second linear motors is hinged to the palm structure through a first spherical pair, and the other end of each of the two second linear motors is hinged to the root of the second phalanx structure through a second spherical pair.

As an optional technical solution, the centers of rotation of two first spherical pairs are symmetrically disposed on the left and right sides of the center of rotation of the spherical pair with pin.

The centers of rotation of two second spherical pairs are symmetrically disposed on the left and right sides of the center of rotation of the spherical pair with pin.

As an optional technical solution, the dexterous bionic finger further includes a third linear motor, two ends of the third linear motor are hinged to the third phalanx structure and the palm structure, respectively, and the third linear motor is used for driving the third phalanx structure to perform the flexion-extension movement.

As an optional technical solution, the first phalanx structure, the second phalanx structure, and the third phalanx structure each include a linear stepper motor and at least two phalanges, two adjacent ones of the at least two phalanges are rotationally connected, the linear stepper motor is disposed between the two adjacent ones of the at least two phalanges, and the linear stepper motor is used for driving the two adjacent ones of the at least two phalanges to rotate relative to each other.

As an optional technical solution, the number of the at least two phalanges in the second phalanx structure is the same as the number of the at least two phalanges in the third phalanx structure.

Alternatively, the number of the at least two phalanges in the first phalanx structure, the number of the at least two phalanges in the second phalanx structure, and the number of the at least two phalanges in the third phalanx structure are the same.

As an optional technical solution, the palm structure is configured to be an L-shaped structure, and an avoidance space is provided on the palm structure and used for avoiding a printed circuit board (PCB) mounted on the palm structure.

BRIEF DESCRIPTION OF DRAWINGS

The present disclosure is further described in detail according to the drawings and embodiments.

Figure 1:
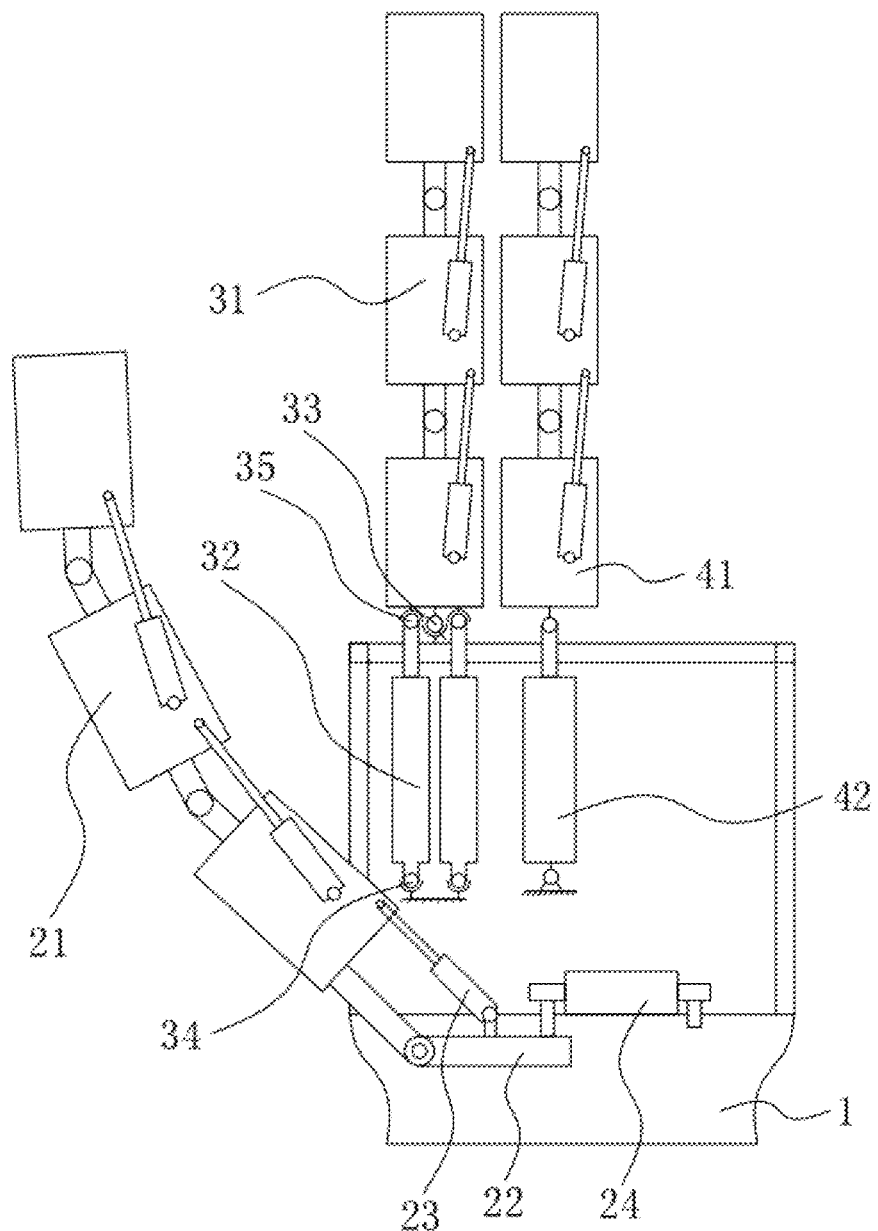
FIG. 1 is a view illustrating the structure of a multi-degree-of-freedom bionic dexterous hand according to an embodiment.

REFERENCE LIST 1 palm structure
11 avoidance space
2 bionic thumb
21 first phalanx structure
22 rotary disk
23 first linear motor
24 root linear motor
3 multifunctional bionic finger
31 second phalanx structure
32 second linear motor
33 spherical pair with pin
34 first spherical pair
35 second spherical pair
4 dexterous bionic finger
41 third phalanx structure
42 third linear motor
100 linear stepper motor
200 phalanx

DETAILED DESCRIPTION

To make the technical problems solved, the technical solutions adopted, and the technical effects achieved in the present disclosure clearer, the technical solutions in embodiments of the present disclosure are further described in detail below in conjunction with the drawings. Apparently, the embodiments described are part, not all, of the embodiments of the present disclosure. Based on the embodiments of the present disclosure, all other embodiments obtained by those skilled in the art without creative work are within the scope of the present disclosure.

In the description of the present disclosure, terms "joined", "connected", and "fixed" are to be understood in a broad sense unless otherwise expressly specified and limited. For example, the term "connected" may refer to "fixedly connected", "detachably connected", or "integrated", may refer to "mechanically connected" or "electrically connected", may refer to "connected directly" or "connected indirectly through an intermediary", or may refer to "connected inside two elements" or "an interaction relation between two elements". For those of ordinary skill in the art, specific meanings of the preceding terms in the present disclosure may be understood based on specific situations.

In the present disclosure, unless otherwise expressly specified and limited, when a first feature is described as "above" or "below" a second feature, the first feature and the second feature may be in direct contact, or the first feature and the second feature may be in contact via another feature between the two features instead of being in direct contact. Moreover, when the first feature is described as being "on", "above", or "over" the second feature, the first feature is right on, above, or over the second feature, the first feature is obliquely on, above, or over the second feature, or the first feature is simply at a higher level than the second feature. When the first feature is described as "under", "below", or "underneath" the second feature, the first feature is right under, below, or underneath the second feature, the first feature is obliquely under, below, or underneath the second feature, or the first feature is simply at a lower level than the second feature.

In the description here, it is to be understood that orientations or position relations indicated by terms such as "upper", "lower", "left", and "right" are based on the drawings. These orientations or position relations are intended only to facilitate description and simplify operations and not to indicate or imply that a device or element referred to must have such particular orientations or must be configured or operated in such particular orientations. Thus, these orientations or position relations are not to be construed as limiting the present disclosure. Moreover, the terms "first" and "second" are used only for distinguishing between descriptions and have no special meanings.

In the description of the specification, reference terms such as "an embodiment" and "example" are intended to mean that specific features, structures, materials, or characteristics described in conjunction with the embodiment or example are included in at least one embodiment or example of the present disclosure. In the specification, the illustrative description of the preceding terms does not necessarily refer to the same embodiments or examples.

Technical solutions in the present disclosure are further described below in conjunction with the drawings and embodiments.

Figure 2:
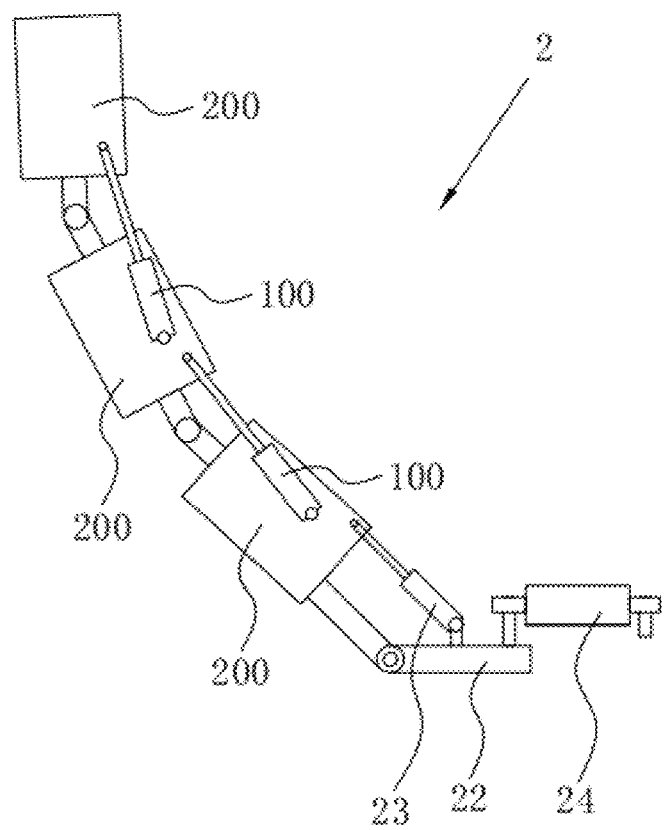
FIG. 2 is a view illustrating the structure of a bionic thumb according to an embodiment.
Figure 3:
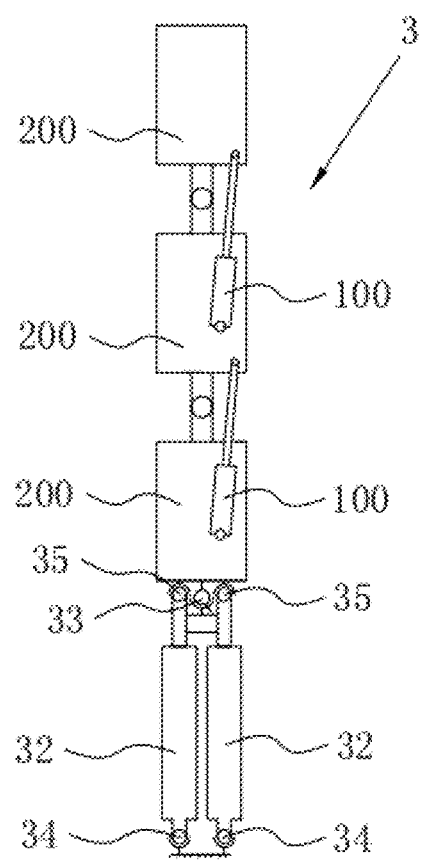
FIG. 3 is a view illustrating the structure of a multifunctional bionic finger according to an embodiment.
Figure 4:
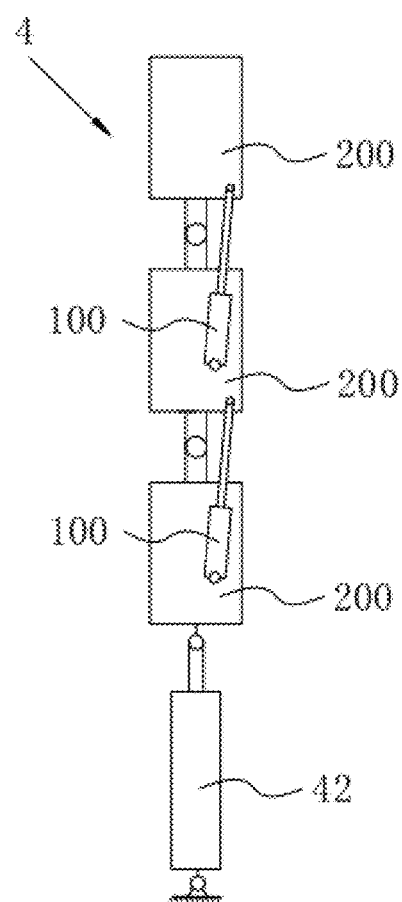
FIG. 4 is a view illustrating the structure of a dexterous bionic finger according to an embodiment.
Figure 5:
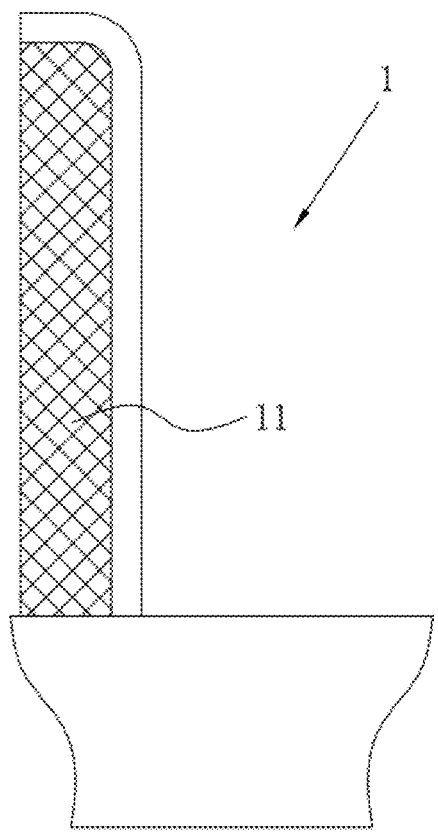
FIG. 5 is a structural view of a palm structure according to an embodiment.

As shown in FIGS. 1 to 5, the multi-degree-of-freedom bionic dexterous hand provided in this embodiment includes a palm structure 1, a bionic thumb 2, a multifunctional bionic finger 3, and a dexterous bionic finger 4. The bionic thumb 2 includes a first phalanx structure 21 and a rotary disk 22, the rotary disk 22 is configured to rotate on the palm structure 1, the first phalanx structure 21 is hinged to the rotary disk 22, and the rotation axis of the rotary disk 22 is not parallel to the rotation axis of the first phalanx structure 21. The multifunctional bionic finger 3 includes a second phalanx structure 31, the second phalanx structure 31 is universally hinged to the palm structure 1, and the second phalanx structure 31 can perform the flexion-extension movement and the swinging movement. The dexterous bionic finger 4 includes a third phalanx structure 41, the third phalanx structure 41 is hinged to the palm structure 1, and the third phalanx structure 41 can perform flexion-extension movement.

Specifically, the rotary disk 22 can drive the first phalanx structure 21 to rotate relative to the palm structure 1 to simulate the left and right swinging movement of the thumb, and the first phalanx structure 21 can rotate relative to the rotary disk 22 to simulate the bending and clenching movements of the thumb; the second phalanx structure 31 is universally hinged to the palm structure 1, and the second phalanx structure 31 can perform the flexion-extension movement and the swinging movement; the third phalanx structure 41 is hinged to the palm structure 1, and the third phalanx structure 41 can perform the flexion-extension movement. The multi-degree-of-freedom bionic dexterous hand provided in this embodiment has multiple degrees of freedom and rich functions.

Linear motors have high driving accuracy and can accurately control the movement trajectories of the bionic fingers so that the bending or swinging amplitudes of the bionic fingers can be accurately controlled. The linear motors have a fast response speed and can control the bionic fingers to quickly switch between various actions. The linear motors still have a self-locking function after a power outage. In some usage scenarios such as a workshop, after the multi-degree-of-freedom bionic dexterous hand grips an object, if a power outage occurs in the workshop and causes the linear motors to lose power, since the linear motors have the self-locking function and keep the bionic fingers in original states, the multi-degree-of-freedom bionic dexterous hand can still grip the object so that the workpiece can be prevented from falling to the ground or hitting other workpieces or other electrical devices, thereby ensuring safety.

Optionally, the bionic thumb 2 further includes a first linear motor 23, two ends of the first linear motor 23 are hinged to the rotary disk 22 and the first phalanx structure 21, respectively, and the first linear motor 23 is used for driving the first phalanx structure 21 to perform the flexion-extension movement. The first linear motor 23 is used for driving the first phalanx structure 21 to perform the flexion-extension movement so that the first phalanx structure 21 has a bending degree of freedom and can clench the object in the palm structure 1.

Optionally, the bionic thumb 2 further includes a root linear motor 24, two ends of the root linear motor 24 are hinged to the rotary disk 22 and the palm structure 1, respectively, and the root linear motor 24 is used for driving the rotary disk 22 to rotate on the palm structure 1. The root linear motor 24 is used for driving the rotary disk 22 so that the first phalanx structure 21 has a swinging degree of freedom.

For the bionic thumb 2 in this embodiment, the root linear motor 24 drives the rotary disk 22 to rotate on the palm structure 1, and the rotary disk 22 drives the first phalanx structure 21 to rotate relative to the palm structure 1 so that the left and right swinging movement of the thumb can be simulated; and the first linear motor 23 drives the first phalanx structure 21 to rotate on the rotary disk 22 so that the bending and clenching movements of the thumb can be simulated.

In this embodiment, the first phalanx structure 21 includes two linear stepper motors 100 and three phalanges 200, two adjacent phalanges 200 are rotationally connected, and one linear stepper motor 100 is disposed between two adjacent phalanges 200.

The bionic thumb 2 in this embodiment has four degrees of freedom. Specifically, the four degrees of freedom include one degree of freedom for the root linear motor 24 to drive the rotary disk 22 to rotate on the palm structure 1, one degree of freedom for the first linear motor 23 to drive the first phalanx structure 21 to rotate on the rotary disk 22, and two degrees of freedom for the two linear stepper motors 100 to drive the adjacent phalanges 200 to rotate relative to each other.

Optionally, the multifunctional bionic finger 3 further includes two second linear motors 32, two ends of each of the two second linear motors 32 are universally hinged to the second phalanx structure 31 and the palm structure 1, respectively, and the two second linear motors 32 are used for driving the second phalanx structure 31 to perform the flexion-extension movement or the swinging movement.

The flexion-extension movement includes a flexion movement and an extension movement. When the second phalanx structure 31 is required to perform the flexion movement, the two second linear motors 32 retract synchronously. When the second phalanx structure 31 is required to perform the extension movement, the two second linear motors 32 extend synchronously. When the second phalanx structure 31 is required to perform the swinging movement, the two second linear motors 32 extend and retract asynchronously, that is, one of the two second linear motors 32 retracts and the other one of the two second linear motors 32 extends so that the second phalanx structure 31 can swing left and right. In the case where the two second linear motors 32 retract synchronously, the gripping force of the second phalanx structure 31 can be increased, thereby ensuring that the object can be gripped stably.

In this embodiment, the second phalanx structure 31 includes two linear stepper motors 100 and three phalanges 200, two adjacent phalanges 200 are rotationally connected, and one linear stepper motor 100 is disposed between two adjacent phalanges 200.

The multifunctional bionic finger 3 in this embodiment has four degrees of freedom. Specifically, the four degrees of freedom include one degree of freedom for the two second linear motors 32 to synchronously drive the second phalanx structure 31 to perform the flexion-extension movement, one degree of freedom for the two second linear motors 32 to asynchronously drive the second phalanx structure 31 to perform the swinging movement, and two degrees of freedom for the two linear stepper motors 100 to drive the adjacent phalanges 200 to rotate relative to each other.

Optionally, the root of the second phalanx structure 31 is hinged to the palm structure 1 through a spherical pair with pin 33, an end of the second linear motor 32 is hinged to the palm structure 1 through a first spherical pair 34, and the other end of the second linear motor 32 is hinged to the root of the second phalanx structure 31 through a second spherical pair 35.

In this embodiment, the body of the second linear motor 32 is hinged to the palm structure 1 through the first spherical pair 34, and the output end of the second linear motor 32 is hinged to the root of the second phalanx structure 31 through the second spherical pair 35, and the spherical pairs have a universal rotation function. When the second linear motors 32 extend or retract, the spherical pairs rotate. In this embodiment, the two second linear motors 32 are used for synchronously or asynchronously driving the second phalanx structure 31 so that the second phalanx structure 31 can perform the flexion-extension movement or the swinging movement.

When the second phalanx structure 31 is required to perform the flexion-extension movement, the two second linear motors 32 are in a parallel state, the central axes of the two second linear motors 32 are parallel and do not coincide, and the extension and retraction speeds of the two second linear motors 32 are the same. In the case where the retraction speeds are equal, the second phalanx structure 31 performs the flexion movement to clench the object in the palm structure 1. In the case where the extension speeds are equal, the second phalanx structure 31 performs the extension movement to release the object.

When the second phalanx structure 31 is required to perform the swinging movement, the two second linear motors 32 are in a parallel state, the central axes of the two second linear motors 32 are parallel and do not coincide, and the asynchronous extension and retraction speeds of the two second linear motors 32 are equal.

When the asynchronous extension and retraction speeds of the two second linear motors 32 are different, the second phalanx structure 31 performs the flexion movement and the swinging movement synchronously rather than performing only the flexion movement or the swinging movement, and the movement trajectory depends on the difference in the asynchronous extension and retraction speeds.

Optionally, the centers of rotation of two first spherical pairs 34 are symmetrically disposed on the left and right sides of the center of rotation of the spherical pair with pin 33, and the centers of rotation of two second spherical pairs 35 are symmetrically disposed on the left and right sides of the center of rotation of the spherical pair with pin 33 so that the swinging trajectory of the second phalanx structure 31 can be controlled more easily. For example, when the asynchronous extension and retraction speeds of the two second linear motors 32 are equal, the second phalanx structure 31 can perform only the swinging movement; and when the synchronous extension and retraction speeds of the two second linear motors 32 are equal, the second phalanx structure 31 can perform only the flexion movement or the extension movement.

Optionally, the first spherical pair 34 includes a first ball sleeve and a first ball head, the first ball head is hinged to the first ball sleeve, the first ball sleeve is fixedly disposed on the palm structure 1, and the first ball head is fixedly disposed on the body of the second linear motor 32.

Optionally, the second spherical pair 35 includes a second ball sleeve and a second ball head, the second ball head is hinged to the second ball sleeve, the second ball sleeve is fixedly disposed on the second phalanx structure 31, and the second ball head is fixedly disposed at the output end of the second linear motor 32.

Optionally, the dexterous bionic finger 4 further includes a third linear motor 42, two ends of the third linear motor 42 are hinged to the third phalanx structure 41 and the palm structure 1, respectively, and the third linear motor 42 is used for driving the third phalanx structure 41 to perform the flexion-extension movement.

Optionally, the first phalanx structure 21, the second phalanx structure 31, and the third phalanx structure 41 each include the linear stepper motors 100 and at least two phalanges 200, two adjacent phalanges 200 are rotationally connected, one linear stepper motor 100 is disposed between the two adjacent phalanges 200, and the linear stepper motor 100 is used for driving the two adjacent phalanges 200 to rotate relative to each other.

Optionally, the number of the phalanges 200 in the second phalanx structure 31 is the same as the number of the phalanges 200 in the third phalanx structure 41. The human thumb has two phalanges, and other fingers have three phalanges. Therefore, in some embodiments, the first phalanx structure 21 includes one linear stepper motor 100 and two phalanges 200, and the second phalanx structure 31 and the third phalanx structure 41 each include two stepper motors and three phalanges 200.

One linear stepper motor 100 is disposed between two adjacent phalanges 200, and the linear stepper motor 100 is used for driving the two phalanges 200 to rotate relative to each other so that the phalanges 200 have the degree of freedom of independent rotation, and the movement of the phalanges 200 is more flexible, thereby satisfying the requirements for independent movement of the phalanges 200.

In this embodiment, the number of the phalanges 200 in the first phalanx structure 21, the number of the phalanges 200 in the second phalanx structure 31, and the number of the phalanges 200 in the third phalanx structure 41 are the same.

The number of the phalanges 200 in the first phalanx structure 21, the number of the phalanges 200 in the second phalanx structure 31, and the number of the phalanges 200 in the third phalanx structure 41 are configured to be the same so that the structures of the phalanges 200 can be universal, thereby reducing the design cost.

Optionally, an avoidance space is provided between two adjacent phalanges 200 so that the two adjacent phalanges 200 can rotate relative to each other within a preset angle.

Optionally, the palm structure 1 is configured to be an L-shaped structure, and an avoidance space 11 is provided on the palm structure 1 and used for avoiding a PCB mounted on the palm structure 1.

In addition, the preceding are only preferred embodiments of the present disclosure and technical principles used therein. It is to be understood by those skilled in the art that the present disclosure is not limited to the embodiments described herein. Those skilled in the art can make various apparent modifications, adaptations, and substitutions without departing from the scope of the present disclosure. Therefore, while the present disclosure has been described in detail through the preceding embodiments, the present disclosure is not limited to the preceding embodiments and may include more other equivalent embodiments without departing from the concept of the present disclosure. The scope of the present disclosure is determined by the scope of the appended claims.

What is claimed is:

1. A multi-degree-of-freedom bionic dexterous hand, comprising:
    a palm structure (1);
    a bionic thumb (2), comprising a first phalanx structure (21) and a rotary disk (22), wherein the rotary disk (22) is configured to rotate on the palm structure (1), the first phalanx structure (21) is hinged to the rotary disk (22), and a rotation axis of the rotary disk (22) is not parallel to a rotation axis of the first phalanx structure (21);
    a multifunctional bionic finger (3), comprising a second phalanx structure (31), wherein the second phalanx structure (31) is universally hinged to the palm structure (1), and the second phalanx structure (31) is capable of performing flexion-extension movement and swinging movement; and
    a dexterous bionic finger (4), comprising a third phalanx structure (41), wherein the third phalanx structure (41) is hinged to the palm structure (1), and the third phalanx structure (41) is capable of performing flexion-extension movement;
    wherein the multifunctional bionic finger (3) further comprises two second linear motors (32), first and second ends of each of the two second linear motors (32) are universally hinged to the second phalanx structure (31) and the palm structure (1), respectively, and the two second linear motors (32) are used for driving the second phalanx structure (31) to perform the flexion-extension movement or the swinging movement; and
    a root of the second phalanx structure (31) is hinged to the palm structure (1) through a spherical pair with pin (33), the first end of each of the two second linear motors (32) is hinged to the palm structure (1) through a first spherical pair (34), and the second end of each of the two second linear motors (32) is hinged to the root of the second phalanx structure (31) through a second spherical pair (35).

2. The multi-degree-of-freedom bionic dexterous hand of claim 1, wherein the bionic thumb (2) further comprises a first linear motor (23), two ends of the first linear motor (23) are hinged to the rotary disk (22) and the first phalanx structure (21), respectively, and the first linear motor (23) is used for driving the first phalanx structure (21) to perform the flexion-extension movement.

3. The multi-degree-of-freedom bionic dexterous hand of claim 2, wherein the first phalanx structure (21), the second phalanx structure (31), and the third phalanx structure (41) each comprise a linear stepper motor (100) and at least two phalanges (200), two adjacent ones of the at least two phalanges (200) are rotationally connected, the linear stepper motor (100) is disposed between the two adjacent ones of the at least two phalanges (200), and the linear stepper motor (100) is used for driving the two adjacent ones of the at least two phalanges (200) to rotate relative to each other.

4. The multi-degree-of-freedom bionic dexterous hand of claim 2, wherein the palm structure (1) is configured to be an L-shaped structure, and an avoidance space (11) is provided on the palm structure (1) and used for avoiding a PCB mounted on the palm structure (1).

5. The multi-degree-of-freedom bionic dexterous hand of claim 1, wherein the bionic thumb (2) further comprises a root linear motor (24), two ends of the root linear motor (24) are hinged to the rotary disk (22) and the palm structure (1), respectively, and the root linear motor (24) is used for driving the rotary disk (22) to rotate on the palm structure (1).

6. The multi-degree-of-freedom bionic dexterous hand of claim 5, wherein the first phalanx structure (21), the second phalanx structure (31), and the third phalanx structure (41) each comprise a linear stepper motor (100) and at least two phalanges (200), two adjacent ones of the at least two phalanges (200) are rotationally connected, the linear stepper motor (100) is disposed between the two adjacent ones of the at least two phalanges (200), and the linear stepper motor (100) is used for driving the two adjacent ones of the at least two phalanges (200) to rotate relative to each other.

7. The multi-degree-of-freedom bionic dexterous hand of claim 5, wherein the palm structure (1) is configured to be an L-shaped structure, and an avoidance space (11) is provided on the palm structure (1) and used for avoiding a PCB mounted on the palm structure (1).

8. The multi-degree-of-freedom bionic dexterous hand of claim 1, wherein
centers of rotation of two first spherical pairs (34) are symmetrically disposed on left and right sides of a center of rotation of the spherical pair with pin (33); and
centers of rotation of two second spherical pairs (35) are symmetrically disposed on the left and right sides of the center of rotation of the spherical pair with pin (33).

9. The multi-degree-of-freedom bionic dexterous hand of claim 8, wherein the first phalanx structure (21), the second phalanx structure (31), and the third phalanx structure (41) each comprise a linear stepper motor (100) and at least two phalanges (200), two adjacent ones of the at least two phalanges (200) are rotationally connected, the linear stepper motor (100) is disposed between the two adjacent ones of the at least two phalanges (200), and the linear stepper motor (100) is used for driving the two adjacent ones of the at least two phalanges (200) to rotate relative to each other.

10. The multi-degree-of-freedom bionic dexterous hand of claim 8, wherein the palm structure (1) is configured to be an L-shaped structure, and an avoidance space (11) is provided on the palm structure (1) and used for avoiding a PCB mounted on the palm structure (1).

11. The multi-degree-of-freedom bionic dexterous hand of claim 1, wherein the dexterous bionic finger (4) further comprises a third linear motor (42), two ends of the third linear motor (42) are hinged to the third phalanx structure (41) and the palm structure (1), respectively, and the third linear motor (42) is used for driving the third phalanx structure (41) to perform the flexion-extension movement.

12. The multi-degree-of-freedom bionic dexterous hand of claim 11, wherein the first phalanx structure (21), the second phalanx structure (31), and the third phalanx structure (41) each comprise a linear stepper motor (100) and at least two phalanges (200), two adjacent ones of the at least two phalanges (200) are rotationally connected, the linear stepper motor (100) is disposed between the two adjacent ones of the at least two phalanges (200), and the linear stepper motor (100) is used for driving the two adjacent ones of the at least two phalanges (200) to rotate relative to each other.

13. The multi-degree-of-freedom bionic dexterous hand of claim 11, wherein the palm structure (1) is configured to be an L-shaped structure, and an avoidance space (11) is provided on the palm structure (1) and used for avoiding a PCB mounted on the palm structure (1).

14. The multi-degree-of-freedom bionic dexterous hand of claim 1, wherein the first phalanx structure (21), the second phalanx structure (31), and the third phalanx structure (41) each comprise a linear stepper motor (100) and at least two phalanges (200), two adjacent ones of the at least two phalanges (200) are rotationally connected, the linear stepper motor (100) is disposed between the two adjacent ones of the at least two phalanges (200), and the linear stepper motor (100) is used for driving the two adjacent ones of the at least two phalanges (200) to rotate relative to each other.

15. The multi-degree-of-freedom bionic dexterous hand of claim 14, wherein a number of the at least two phalanges (200) in the second phalanx structure (31) is the same as a number of the at least two phalanges (200) in the third phalanx structure (41); or
a number of the at least two phalanges (200) in the first phalanx structure (21), a number of the at least two phalanges (200) in the second phalanx structure (31), and a number of the at least two phalanges (200) in the third phalanx structure (41) are the same.

16. The multi-degree-of-freedom bionic dexterous hand of claim 1, wherein the palm structure (1) is configured to be an L-shaped structure, and an avoidance space (11) is provided on the palm structure (1) and used for avoiding a PCB mounted on the palm structure (1).

* * * * *